United States Patent
Senda

(10) Patent No.: US 12,008,358 B2
(45) Date of Patent: Jun. 11, 2024

(54) STORAGE MEDIUM STORING UPDATE MANAGEMENT PROGRAM, INFORMATION PROCESSING DEVICE, AND UPDATE MANAGEMENT METHOD

(71) Applicant: Mitsubishi Electric Corporation, Tokyo (JP)

(72) Inventor: Toru Senda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/925,827

(22) PCT Filed: Jul. 31, 2020

(86) PCT No.: PCT/JP2020/029402
§ 371 (c)(1),
(2) Date: Nov. 17, 2022

(87) PCT Pub. No.: WO2022/024334
PCT Pub. Date: Feb. 3, 2022

(65) Prior Publication Data
US 2023/0176852 A1 Jun. 8, 2023

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ..................................... G06F 8/65; G06F 8/71
(Continued)

(56) References Cited

U.S. PATENT DOCUMENTS

2011/0072423 A1* 3/2011 Fukata ................ G06F 9/44552
717/172
2012/0079470 A1* 3/2012 Fukatsu ............... G05B 19/056
717/168
(Continued)

FOREIGN PATENT DOCUMENTS

JP 10-269065 A 10/1998
JP 2004-355414 A 12/2004
(Continued)

OTHER PUBLICATIONS

Mugarza et al, "analysis of existing dynamic software updating techniques for safe and secure industrial control systems", 2018, [Online], pp. 121-131, [Retrieved from internet on Feb. 29, 2024], <chrome-extension://efaidnbmnnnibpcajpcglclefindmkaj/https://www.witpress.com/Secure/ejournals/papers/SSE0> (Year: 2018).*
(Continued)

*Primary Examiner* — S. Sough
*Assistant Examiner* — Zengpu Wei
(74) *Attorney, Agent, or Firm* — XSENSUS LLP

(57) ABSTRACT

An update management program makes an information processing device realize functions of: acquiring updated version information on software of an engineering tool and firmware of a control device; acquiring a software version of the engineering tool installed in the information processing device; acquiring a firmware version of the firmware installed in the control device connected to the information processing device; confirming available updated versions for the software version and for the firmware version on the basis of comparison with the updated version information; creating an update screen for selecting auto-updating for the software and the firmware installed; and instructing that the software of the engineering tool and the firmware of the control device for which the auto-updating is selected on the
(Continued)

update screen and the updated versions are confirmed be automatically updated to the updated versions.

19 Claims, 15 Drawing Sheets

(58) Field of Classification Search
USPC .......................................................... 717/170
See application file for complete search history.

(56) References Cited

U.S. PATENT DOCUMENTS

| | | | |
|---|---|---|---|
| 2012/0259965 | A1 | 10/2012 | Tsuzuki et al. |
| 2014/0081431 | A1* | 3/2014 | Nakata ............... G05B 19/0426 700/83 |
| 2014/0130032 | A1* | 5/2014 | Lipinski .................... G06F 8/65 717/171 |
| 2015/0331688 | A1* | 11/2015 | Shimizu .................. G06F 8/654 717/170 |
| 2016/0019048 | A1* | 1/2016 | Tsuboi .................... G06F 11/14 717/168 |
| 2016/0357547 | A1 | 12/2016 | Menjo et al. |
| 2018/0357058 | A1* | 12/2018 | Malaspina .............. H04L 67/34 |
| 2019/0205115 | A1* | 7/2019 | Gomes .................... H04W 4/50 |
| 2019/0362096 | A1* | 11/2019 | Barday ..................... G06F 8/71 |

FOREIGN PATENT DOCUMENTS

| | | |
|---|---|---|
| JP | 2009-230400 A | 10/2009 |
| JP | 2010-3047 A | 1/2010 |
| JP | 2012-221185 A | 11/2012 |
| JP | JPWO2013/014961 A1 | 1/2013 |
| JP | 2014-191797 A | 10/2014 |
| JP | 2018-67054 A | 4/2018 |
| JP | 2018-180722 A | 11/2018 |
| WO | 2015/083243 A1 | 6/2015 |

OTHER PUBLICATIONS

Japanese Decision to Grant issued Jan. 18, 2022, in corresponding Japanese Patent Application 2021-506005.
International Search Report and Written Opinion mailed on Nov. 2, 2020, received for PCT Application PCT/JP2020/029402, filed on Jul. 31, 2020, 9 pages including English Translation.
Notice of Reasons for Refusal mailed on Jun. 1, 2021, received for JP Application 2021-506005, 8 pages including English Translation.
Notice of Reasons for Refusal mailed on Sep. 21, 2021, received for JP Application 2021-506005, 10 pages Including English Translation.

\* cited by examiner

| Name of engineering tool | Model name of software | Updated version | Updated date |
|---|---|---|---|
| AAAA | aa11 | 1.000 | YYYY/MM/DD |
| BBBB | bb11 | 2.001 | YYYY/MM/DD |
| ... | ... | ... | ... |

(b)

| Name of control device | Name of functional unit | Model name of firmware | Updated version | Updated date |
|---|---|---|---|---|
| AAAA | AAAA | aa22 | 1.000 | YYYY/MM/DD |
| | BBBB | bb22 | 2.000 | YYYY/MM/DD |
| | CCCC | cc22 | 3.000 | YYYY/MM/DD |
| BBBB | DDDD | dd22 | 1.000 | YYYY/MM/DD |
| ... | ... | ... | ... | ... |

FIG. 3

| Update setting | | |
|---|---|---|
| Name of engineering tool | Update method | |
| AAAA | Auto | ▶ |
| BBBB | Manual | ▶ |

| Name of control device | Name of functional unit | Update method | |
| --- | --- | --- | --- |
| CCCC | DDDD | Auto | ▶ |
| | EEEE | Auto | ▶ |
| | | Manual | |

FIG. 4

Update setting

Setting of starting conditions

☑ Periodically check for latest updated version

Time: [10] o'clock [20] minutes

Day of week: ☐ Sunday  ☑ Monday  ☐ Tuesday  ☐ Wednesday
             ☐ Thursday  ☐ Friday  ☐ Saturday List of auto-updating targets

| Name |
|------|
| AAAA |
| CCCC/DDDD |

FIG. 8

Unit configuration diagram

Select components

| PLC1 | Name | F/W | Current version | Updated version |
|---|---|---|---|---|
| POW | AAAA | aa22 | 1.100 | 1.100 |
| CPU | BBBB | bb22 | 1.100 | 1.100 |
| 1 | CCCC | cc22 | 1.100 | 1.300 |
| 2 | CCCC | cc22 | 1.100 | 1.300 |
| 3 | | | | |
| 4 | DDDD | dd22 | 1.500 | 1.500 |
| 5 | | | | |
| 6 | | | | |
| 7 | | | | |

| SV1 | Name | F/W | Current version | Updated version |
|---|---|---|---|---|
| 1 | EEEE | ee22 | 1.000 | 1.000 |

FIG. 9

| Select components | | | | |
|---|---|---|---|---|
| PLC1 | Name | F/W | Current version | Updated version |
| POW | AAAA | aa22 | 1.100 | 1.100 |
| CPU | BBBB | bb22 | 1.100 | 1.100 |
| 1 | CCCC | cc22 | 1.100 | 1.300 |
| 2 | CCCC | cc22 | 1.100 | 1.300 |
| 3 | | | | |
| 4 | DDDD | dd22 | 1.500 | 1.500 |
| 5 | | | | |
| 6 | | | | |
| 7 | | | | |

| SV1 | Name | F/W | Current version | Updated version |
|---|---|---|---|---|
| 1 | EEEE | ee22 | 1.000 | 1.000 |

Unit configuration diagram 1.300
1.200
1.000

FIG. 11

| Name of engineering tool | Model name of software | Updated version | Updated date | Information on functional limitation |
|---|---|---|---|---|
| AAAA | aa11 | 1.200 | YYYY/MM/DD | Function A becomes unavailable when version of Firmware bb22 of Functional unit BBBB in Control device BBBB is ver1.500 or smaller. |
| AAAA | aa11 | 1.100 | YYYY/MM/DD | — |
| AAAA | aa11 | 1.000 | YYYY/MM/DD | — |

STORAGE MEDIUM STORING UPDATE MANAGEMENT PROGRAM, INFORMATION PROCESSING DEVICE, AND UPDATE MANAGEMENT METHOD

CROSS-REFERENCE TO RELATED APPLICATION

The present application is based on PCT filing PCT/JP2020/029402, filed Jul. 31, 2020, the entire contents of which is incorporated herein by reference.

TECHNICAL FIELD

The present disclosure is related to an update management program.

BACKGROUND ART

In a control device such as a programmable logic controller (hereinafter, referred to as PLC), a numerical controller, and a motion controller, firmware to control the device is written in a non-volatile memory such as a read only memory (ROM) included in the control device. In a case where such firmware is to be updated, there is a method to manually transfer updated data stored in a memory such as flash memory to a ROM for updating.

In the control device as described above, it is possible to install various extension units in addition to the units for basic functions such as a power supply unit and a central processing unit (CPU). It is time-consuming for the user to manually update the firmware of each of the functional units. Therefore, a technology is proposed to automate the updating of the firmware of the control device. For example, Patent Document 1 discloses a method for automatically updating firmware, in which an engineering tool, which is installed on a personal computer (PC), has a function to update the firmware, thereby instructing each functional unit provided in a PLC connected to the PC to update the firmware and writing new firmware to each functional unit.

PRIOR ART DOCUMENTS

Patent Documents

[Patent Document 1] International Publication No. 2015-083243

SUMMARY OF THE INVENTION

Problems to be Solved by the Invention

However, in the technical matters disclosed in Patent Document 1, although it is understood that the update of the firmware on the side of the control device is automated, there is no mention about the update of the software of the engineering tool executed on the side of the PC. The engineering tool has various functions such as creating and editing a control program for the control device, setting control parameters, and monitoring processes performed, in which the engineering tool and the control device work together. Therefore, the software of the engineering tool and the firmware of the control device each need to be managed to be an appropriate version in consideration of the consistency between them.

Also, the control device, which controls the operation of a machine tool in a production site, is strongly required to operate stably with low risk of malfunctioning. The change in the combination of the versions of the software of the engineering tool and the firmware of the control device due to an updating that the user does not intend may limit some of the functions of the engineering tool or the control device. As a result, problems such as malfunction or breakdown of a machine and deterioration of product quality may occur. Therefore, it is not necessary that the software of the engineering tool and the firmware of the control device be always updated to their respective latest versions. Rather, it may be preferable in some cases to select a combination of their versions that allows stable operation with low risk of malfunctioning.

For example, a production site may continue to use the old version of software even after the release of the latest version and update the version of the software only after verifying the safety of the latest version in a test environment. On the other hand, in development, the addition of functions by updating is their major interest, so that the latest version may be introduced without verification at the same time as the latest version is released.

As described above, in updating the software of the engineering tool and the firmware of the control device, there has been a problem of appropriately managing the updates of the versions of the software and the firmware by preventing the updating that the user does not intend.

The present disclosure, devised to solve the above-mentioned problem, aims to provide an update management program, an information processing device, and an update management method that enable appropriate management of the updating the versions of the software and the firmware by preventing an update unintended by the user in updating the software of the engineering tool and the firmware of the control device.

Means for Solving Problem

In order to solve the problem described above and achieve the aim, the update management program, according to the present disclosure, to be executed in an information processing device and to make the information processing device function as: an updated version acquisition means for acquiring updated version information on software of an engineering tool and firmware of a control device; a software information acquisition means for acquiring a software version of the engineering tool installed in the information processing device; a firmware information acquisition means for acquiring a firmware version of the firmware installed in the control device to be connected to the information processing device; a version comparison means for confirming available updated versions for the software version and for the firmware version on the basis of comparison with the updated version information; an update screen creation means for creating an update screen for selecting auto-updating for the software and the firmware installed; and a means for instructing that the software of the engineering tool and the firmware for the control device for which the auto-updating is selected on the update screen and the updated versions are confirmed be automatically updated to the updated versions, wherein the update screen creation means displays a plurality of slots to mount components of the control device and the components mounted on the slots in a visually distinguishable manner and creates, when one of the components of the control device being displayed is specified, an update screen to display information related to the update of the firmware of the component.

Effects of the Invention

According to the present disclosure, in updating the software of the engineering tool and the firmware of the control device, appropriate management of the updating the versions of the software and the firmware is enabled by preventing an update unintended by the user.

BRIEF DESCRIPTION OF THE DRAWINGS

FIG. 2 is a diagram showing a content example of updated version information according to Embodiment 1.

FIG. 3 is a diagram showing an example of an update screen in which auto-updating according to Embodiment 1 is selected.

FIG. 4 is a diagram showing an example of an update screen in which starting conditions of the auto-updating according to Embodiment 1 are set.

FIG. 8 is a diagram showing an example of an update screen according to Embodiment 2.

FIG. 9 is a diagram showing an example of the update screen according to Embodiment 2.

FIG. 11 is a diagram showing a content example of updated version information according to Embodiment 4.

EMBODIMENTS FOR CARRYING OUT THE INVENTION

Figure 1:
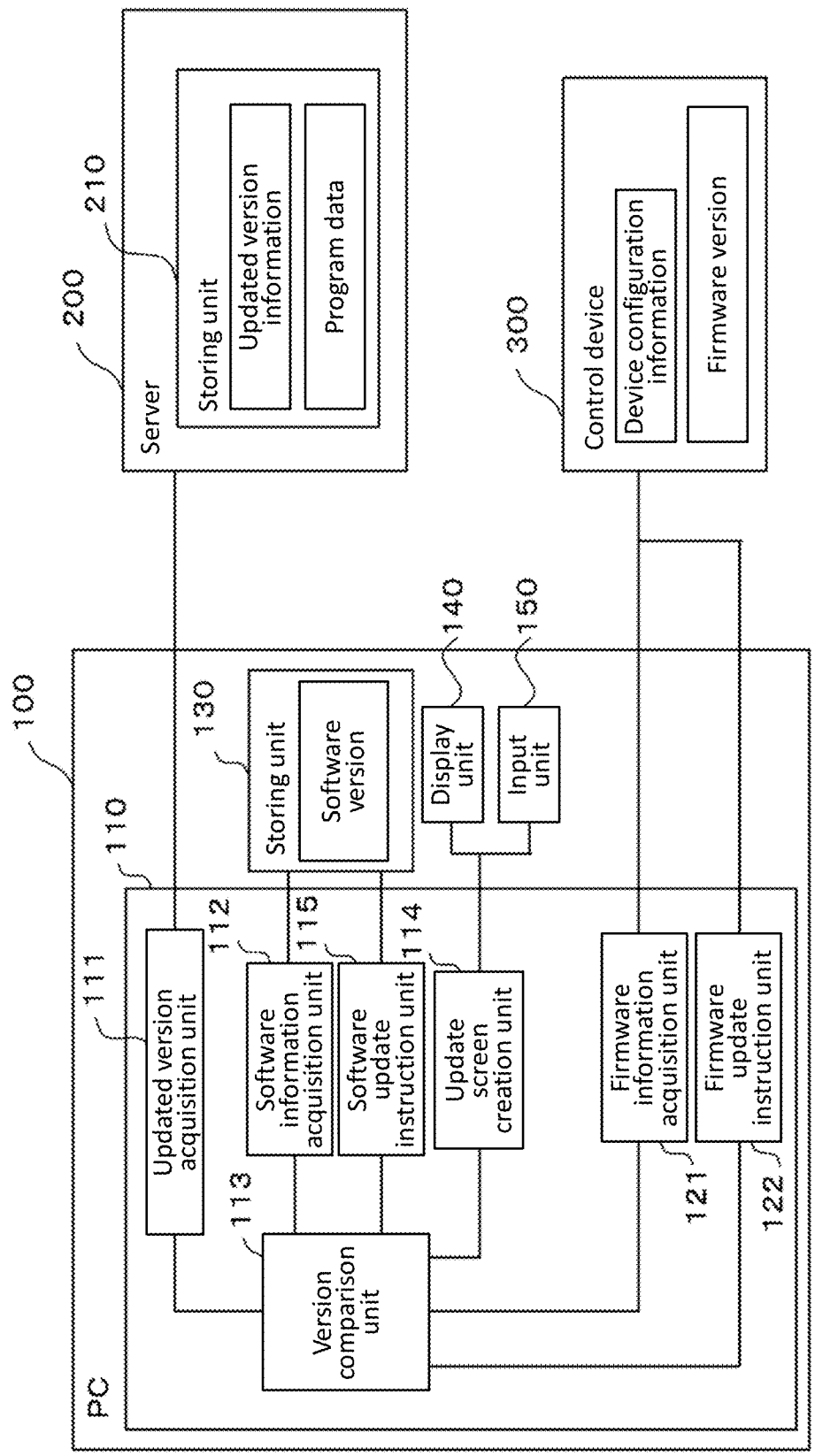
FIG. 1 is a diagram showing a configuration example of an information processing system according to Embodiment 1.

Hereinafter, the embodiments of the present disclosure will be described using drawings. In the drawings, the same symbols are given to the parts that are identical or equivalent. Descriptions will be simplified or omitted as appropriate in case of duplication. Note that the embodiments described below are not intended to limit the scope of the present disclosure.

Embodiment 1

An update management program according to Embodiment 1 will be described below.

FIG. 1 is a diagram showing a configuration example of an information processing system. The information process-ing system shown in FIG. 1 includes a PC 100, a server 200, and a control device 300. The PC 100 corresponds to an information processing device in the present disclosure. FIG. 1 shows, for simplicity, one for each of the PC 100, the server 200, and the control device 300, but there is no limit to the number of their connections. For example, the configuration may be such that a plurality of the control devices 300 are connected to the PC 100.

The server 200 stores, in a storing unit 210, updated version information that includes the latest versions of the software of the engineering tool and the firmware of the control device, and program data that runs an installer and the like required for the up dating.

The control device 300 represents a control device that is generally used in the factory automation (FA) field, such as a PLC, a numerical control device, a motion controller, a machine automation controller, and a servo controller.

There is no specific restriction on where the PC 100, the server 200, and the control device 300 should be placed and on how they should be connected. For example, the PC 100, the server 200, and the control device 300 are not necessarily required to be located in the same building, and the server 200 and the control device 300 may be located remotely from the PC 100. The PC 100, the server 200, and the control device 300 may be connected via a public line including the Internet, a wide area network (WAN), a local area network (LAN), and a network as a combination of these three.

As shown in FIG. 1, the PC 100 includes an update management application 110, a storing unit 130, a display unit 140, and an input unit 150. The PC 100 also includes a portable computer such as a programmable display, a tablet computer, a notebook computer, and a smartphone, in addition to a stationary computer such as a desktop PC. The storing unit 130 is a storage area such as ROM or a random-access memory (RAM) of the PC 100, in which the respective versions of the software of the engineering tool installed in the PC 100 are stored. In a case where a plurality of engineering tools is installed in the PC 100, the software versions of the engineering tools are associated with the respective engineering tools and stored as such. The display unit 140 is a known display device such as a liquid crystal display panel. The input unit 150 is a device such as a mouse, a keyboard, or a touch panel, which enables input of information to the PC 100. The storing unit 130, the display unit 140, and the input unit 150 may be external to the PC 100.

The update management application 110 includes an updated version acquisition unit 111, a software information acquisition unit 112, a version comparison unit 113, an update screen creation unit 114, a software update instruction unit 115, a firmware information acquisition unit 121, and a firmware update instruction unit 122. The update management application 110 is realized by the PC 100 executing the update management program. The units of the update management application 110 shown in FIG. 1 are each a functional module representing a function (means).

The updated version acquisition unit 111 acquires the updated version information from the server 200. The software information acquisition unit 112 acquires the software versions of the engineering tool installed in the PC 100 from the storing unit 130.

The firmware information acquisition unit 121 acquires the firmware versions of the firmware installed in the control device 300 from the control device 300. In a case where control device 300 includes a plurality of functional units, the firmware versions of the respective functional units are acquired.

The version comparison unit 113 checks, on the basis of the comparison with the updated versions included in the updated version information, whether there are updated versions corresponding to the software version of the engineering tool currently installed in the PC 100 and to the firmware version of the firmware currently installed in the control device 300. For example, in a case when the version number of the software version of the engineering tool currently installed is "1.100" and the latest updated version included in the updated version information is "1.200", it is confirmed by comparison between the version numbers that there is "1.200" as the updated version for the software version of the engineering tool currently installed.

The update screen creation unit 114 creates the update screen. The created update screen appears on the display unit 140 of the PC 100. As for the software and the firmware for which auto-updating is selected in the update screen created by the update screen creation unit 114 and it is confirmed that they have their updated versions by the version comparison unit 113, the update management application 110 outputs instructions for the software update instruction unit 115 and the firmware update instruction unit 122 to execute the auto-updating to their respective updated versions. As a result, the program data necessary to update the software and the firmware are downloaded from the server 200 and the auto-updating to the updated versions is executed.

FIG. 2 is a diagram showing a content example of the updated version information. FIG. 2(*a*) shows the contents of the software for the engineering tools and FIG. 2(*b*) shows the contents of the firmware for the control devices 300. As for the engineering tools, the name, the software model name, the updated version, and the updated date are included. As for the firmware, the control device name, the name of the functional unit that can be installed in the control device, the firmware model name, the updated version, and the updated date are included. In the case of a control device without a functional unit, the information on the firmware of the control device is described, leaving the column for the functional unit blank. The updated version shown in FIG. 2 is the latest version of the software and the firmware. The contents are not limited to these. For example, updated file size and items for update history such as previous versions, their updated dates, and the updated contents may be included. The updated version information is provided, for example, in a text format. However, the file format is not limited to that as long as the PC 100 can read the file.

FIG. 3 is a diagram showing an example of the update screen in which the auto-updating is selected. The operation on the update screen enables the selection of the auto-updating individually for the software of the engineering tool and the firmware of the control device. As illustrated in the figure, as for the engineering tools, columns are provided for engineering tool name and updating method. Similarly, as for the control device 300, columns are provided for control device name, functional unit name, and updating method. The user operates the input unit 150 to specify specific software and specific firmware and select the auto-updating or the manual-updating.

The displaying method on the screen is not limited to that shown in FIG. 3. For example, for each of the software and the firmware, there may be a check box to allow or disallow the auto-updating. In that case, the user can select the auto-updating by checking the checkbox. With such a screen, the manual-updating is assigned to the software and the firmware that the user does not want to be automatically updated. This prevents the auto-updating that the user does not intend. Furthermore, also the auto-updating can be selected if necessary, so that it is possible to reduce the workload on the user for updating.

FIG. 4 is a diagram showing an example of an update screen in which starting conditions of the auto-updating are set. The starting conditions for the auto-updating of the software and the firmware for which the auto-updating is selected on the update screen shown in FIG. 3 can be set at the user's discretion.

In the case where "Periodically check for the latest updated version" is selected on the screen, the time and day of the week for the update confirmation can be set. When the specified day of the week and time of the day comes, the auto-updating process starts, in which the updated version acquisition unit 111 accesses the server 200 to acquire the updated version information. Note that FIG. 3 and FIG. 4 may be integrated into a single screen, in which the software and the firmware for which the auto-updating is selected may be displayed as a list of the auto-updating targets as shown in FIG. 4.

As for the starting conditions of the auto-updating, it is also possible to allow specifying a specific date instead of specifying a day of the week and a time of the day. The starting conditions of the auto-updating can be set to any timing desired by the user, for example, to avoid periods when there is an impact on the production. In a case where the swift introduction of the latest updated versions is desired, the reception of the notice, sent from the server 200 to the updated version acquisition unit 111, on the content changes in the updated version information may be set as the starting condition of the auto-updating. Instead, after receiving such a notice, the fact that the updated version acquisition unit 111 has further accessed the server 200 and acquired the updated version information may be set as the starting condition of the auto-updating. Furthermore, even in the case where the starting conditions are set using a day of the week and a time of the day as described above, if no notification is received from the server 200, the confirmation of the updated version information from the PC 100 to the server 200 may be omitted by the setting. As described above, it is possible to set the content change in the updated version information as the starting condition of the auto-updating.

Figure 5:
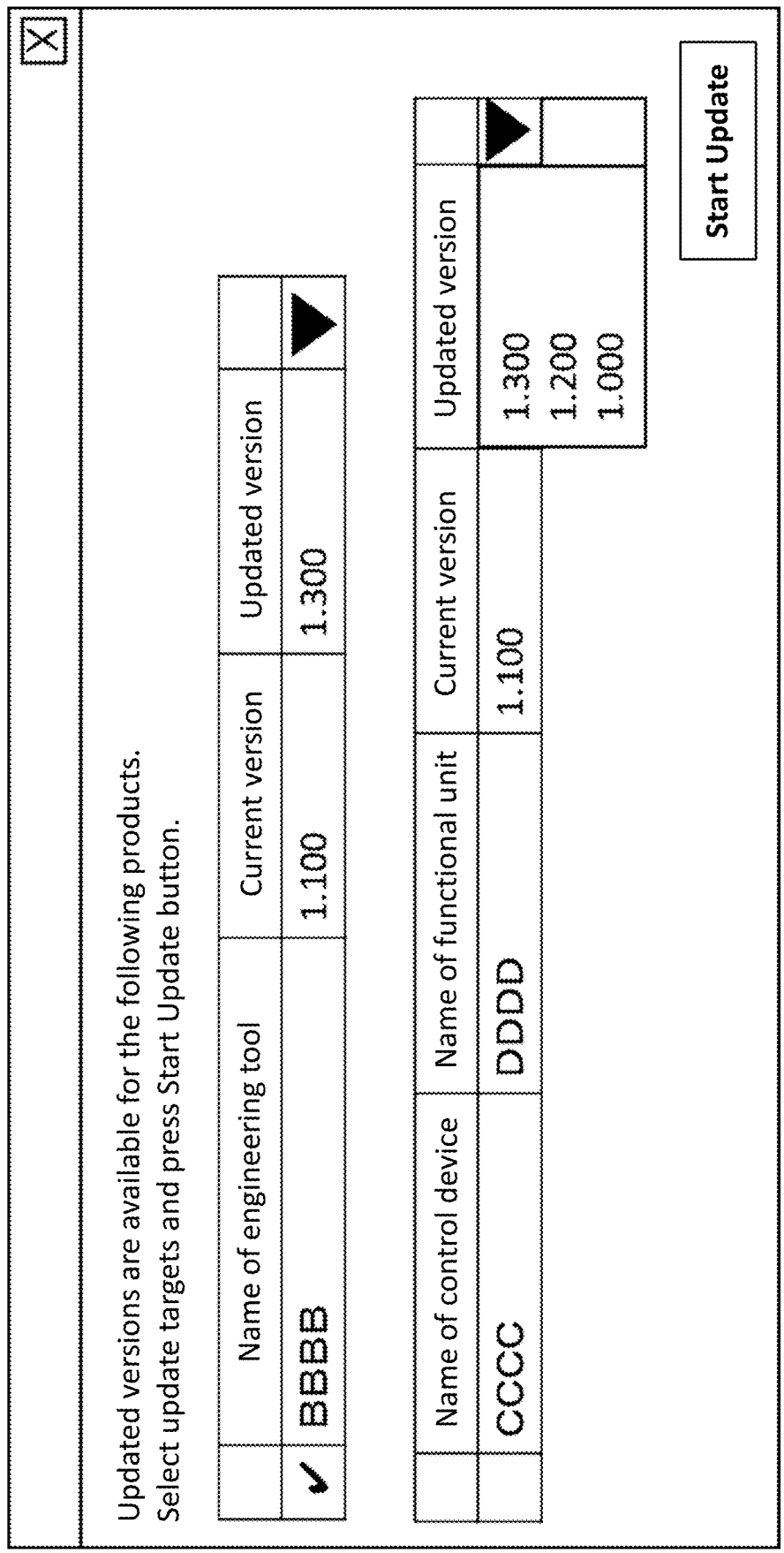
FIG. 5 is a diagram showing an example of an update screen in which manual-updating according to Embodiment 1 is started.

FIG. 5 is a diagram showing an example of an update screen in which manual-updating is started. For each of the software of the engineering tool and the firmware of the control device 300, the current version and the available updated versions are shown. As illustrated, the choices for the updated version are not limited to the latest version but can also include old versions. When the update screen is launched to work on the manual-updating, the software version of the engineering tool and the firmware version of the firmware of the control device 300, both currently installed, are acquired, and the updated version information is also acquired from the server 200. The user checks the current versions and the updated versions for each of the software and the firmware on the screen and selects the desired versions. When Start Update Button is selected, a manual version update process is executed.

Figure 6:
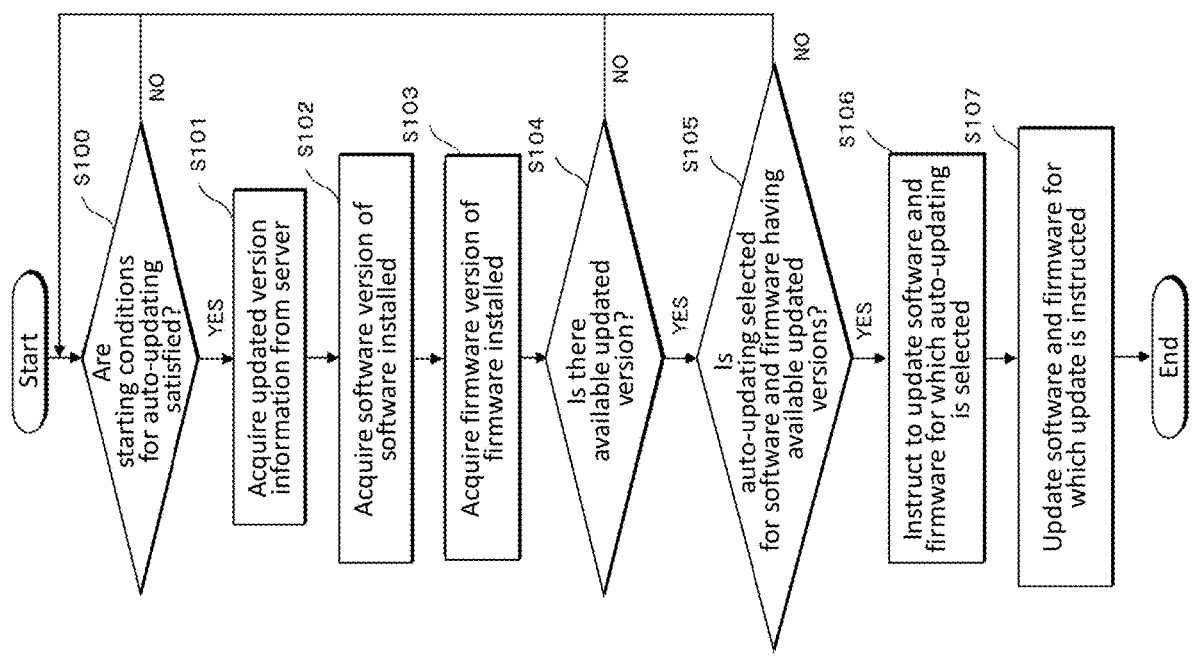
FIG. 6 is an example of a flowchart of an auto-updating process according to Embodiment 1.

FIG. 6 is an example of a flowchart of the auto-updating process. Note that it is assumed that, in FIG. 3, the auto-updating is selected for at least one of the software modules of the engineering tools and the firmware of the control device 300. The order of the steps in the flowchart is an example shown for an illustrative purpose and does not limit the present disclosure. For example, depending on the contents of the processing, back-and-forth switching or concurrent execution by parallel processing in the flow of the steps is possible. This also applies to the flowcharts described later.

In Step S100, it is determined whether the starting conditions for the auto-updating are satisfied. The update management application 110 determines whether the prescribed starting conditions set in the update screen shown in FIG. 4 are met. The flow of the auto-updating process does not proceed until the starting conditions of the auto-updating are satisfied.

Once the starting conditions of the auto-updating are satisfied, in Step S101 the updated version acquisition unit 111 accesses the server 200 to acquire the updated version information. In a case where the setting is such that, if there is a change in the contents of the updated version information, the server 200 sends a notification to that effect to the PC 100 and thus the updated version information is kept up to date on the side of the PC 100, Step S101 can be omitted.

In Step S102, the software information acquisition unit 112 acquires from the storing unit 130 the software versions of the engineering tools installed in the PC 100.

In Step S103, the firmware information acquisition unit 121 acquires the firmware versions of the firmware installed in the control devices 300 whose firmware updates are managed by the PC 100.

In Step S104, the version comparison unit 113 confirms the available updated versions for the software version and the firmware version acquired as above on the basis of the comparison between the current and the updated versions for the software of the engineering tools and the firmware of the control devices 300 included in the updated version information. In a case where the software version and the firmware version are the same as their respective updated versions included in the updated version information, then the auto-updating is not executed. In this case, the flow of the auto-updating returns to Step S100 and does not proceed until the starting conditions for the auto-updating are met next.

In Step S104, in a case where the available updated version is confirmed for the software and the firmware, the flow proceeds to Step S105. In Step S105, it is determined whether the auto-updating is selected in the update screen for the software and the firmware for which there are the updated versions. In a case where the auto-updating is selected for neither of them, the flow of the auto-updating returns to Step S100 and does not proceed until the starting conditions for the auto-updating are met next.

In a case where the auto-updating is selected for the software and/or the firmware for which there are updated versions, the flow proceeds to Step S106 and the update management application 110 instructs to update the software and/or the firmware to their respective updated versions.

In accordance with the update instruction, in Step S107, the program data necessary for the updating is downloaded from the storing unit 210 of the server 200, and the software and the firmware to be updated are automatically updated to their respective updated versions. This completes the auto-updating.

Figure 7:
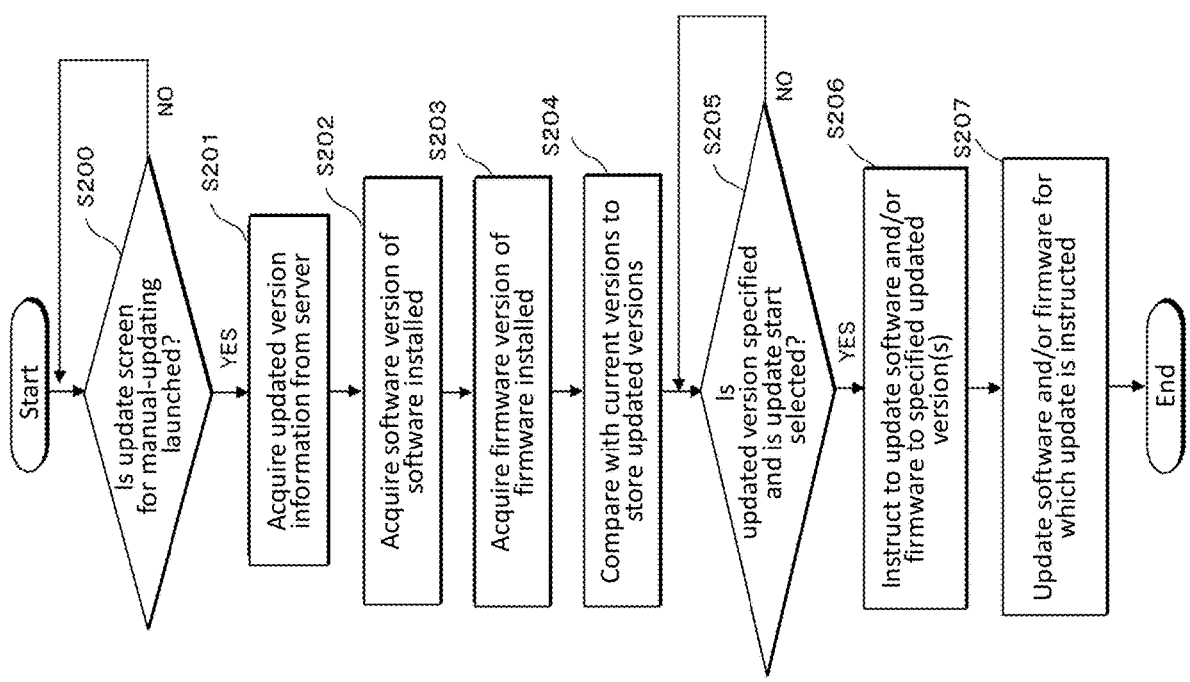
FIG. 7 is an example of a flowchart of a manual-updating process according to Embodiment 1.

FIG. 7 is an example of a flowchart of a manual-updating process. Note that it is assumed that, in FIG. 3, the auto-updating is not selected, in other words, the manual-updating is selected, for at least one of the software modules of the engineering tools and the firmware of the control device 300.

In Step S200, it is determined whether the update screen of the manual-updating shown in FIG. 5 is launched. The launch of this screen triggers the start of the flow of the manual-updating process. At this stage, the current versions and the updated versions for the software and the firmware have not been acquired yet. They are acquired through the processes from Step S201 to Step S203. These processes are similar to Step S101 to Step S103 in FIG. 6, so that their descriptions are omitted.

In Step S204, the version comparison unit 113 compares the updated versions in the updated version information and the current versions, checks whether there are the updated versions for the software and the firmware currently installed, and displays the confirmed updated versions other than the current versions on the update screen shown in FIG. 5 as the candidates for the updating. The updated versions here are not limited to the latest versions but may include old versions.

In Step S205, it is determined whether the user has specified one of the versions for the software or the firmware from the displayed updated versions and has selected Start Update Button on the screen.

In Step S206 and Step S207, the update to the updated version selected by the user is executed. In these steps, the same processing is performed as in Step S106 and Step S107 of FIG. 6, so that their descriptions are omitted.

The update management program according to Embodiment 1 makes the information processing device function as: an updated version acquisition means for acquiring updated version information on software of an engineering tool and firmware of a control device; a software information acquisition means for acquiring a software version of the engineering tool installed in the information processing device; a firmware information acquisition means for acquiring a firmware version of the firmware installed in the control device connected to the information processing device; a version comparison means for confirming an available updated version for the software version and the firmware version on the basis of comparison with the updated version information; an update screen creation means for creating an update screen for selecting auto-updating for the software and the firmware installed; and a means for instructing that the software of the engineering tool and the firmware of the control device for which the auto-updating is selected on the update screen and the updated versions are confirmed be automatically updated to the updated versions. In updating the software of the engineering tools and the firmware of the control devices 300, this makes it possible to prevent the updates unintended by the user and to properly manage the updates of the respective versions.

Embodiment 2

An update management program according to Embodiment 2 will be described below. The configuration of the PC 100 and the flows of the auto-updating process and the manual-updating process are the same as those in Embodiment 1, so that their descriptions are omitted.

The control device 300 may include a plurality of functional units, and it is notable that in some cases, they are identical or similar in model or function. In such cases, the user may accidentally execute an incorrect update operation, such as the version update by the auto-updating or the manual-updating for a functional unit different from the user's intended functional unit, resulting in a problem such as the malfunction of the devices.

In the present embodiment, in order to prevent the user from making such a mistake, the components of the control device 300, in other words, the functional units including firmware are displayed in a visually distinguishable manner on the update screen provided by the update screen creation unit 114. The user is given visual information about the control device 300, the functional units, and also the devices connected to the control unit 300 to specify an update target. The display of the components may be enabled by the firmware information acquisition unit 121 acquiring device configuration information from each control device 300.

FIG. 8 is a diagram showing an example of an update screen according to Embodiment 2. A unit configuration diagram showing the components of the control device 300 is displayed on the update screen. Here, a PLC is exemplified as the control device 300. The denotations are as follow: "PLC1" for the PLC; "POW" for the power supply unit; "CPU" for the CPU unit; and Numbers "1" to "7" for Slots 1 to 7 to mount the functional units. As illustrated, the functional units are mounted on Slots 1, 2, and 4. It is also shown that a servo controller "SV1" is connected to the functional unit mounted on Slot 1.

In addition to the figure showing the components of the control device 300, name, current version, and latest updated version of the firmware (F/W) of the functional units of PLC1 and SV1 are listed. The list does not have to be displayed together with the unit configuration diagram. When the user specifies a specific functional unit in the unit configuration diagram with a cursor of a mouse or the like as the input unit 150, a window opens to show the information related to the update of the firmware for the functional unit.

FIG. 9 is a diagram showing an example of the update screen according to Embodiment 2. The figure shows a case in which the user specifies, in FIG. 8, a specific functional unit with the cursor of the mouse. When the functional unit in Slot 2 is specified by the cursor, the screen is changed to a screen in which the functional unit is surrounded by a frame to indicate that it is selected. When a component is specified, the information related to the update of firmware, such as available updated versions of the functional unit, is displayed. The user can select a desired version from among them to execute manual-updating. Alternatively, the list shown in FIG. 8 may be displayed along with the unit configuration diagram that shows the components. In that case, when a specific functional unit is specified in the unit configuration diagram, the information related to the update of the firmware of the functional unit specified in the list is highlighted, and the version is updated by rewriting the content. Although FIG. 9 shows an example of the operation of the manual-updating of the versions, an option to select the auto-updating may be included as the information required for the update.

Although the components of the control device 300 are shown in a planar view in the examples shown in FIG. 8 and FIG. 9, the contents of the display are not limited to these and may include three-dimensional views, photographs, diagrams containing a dynamic element and the like as visually distinguishable forms. Although the update screen creation unit 114 creates such an update screen on the basis of the device configuration information acquired from each control device 300, the way to display may be configured to be customizable by the user's discretionary selection of figures and the like. Also, although it is described that the information related to the version update of the specified component is displayed in the window that opens, the way of displaying information is not limited to this and may include displaying by right-clicking on the mouse and displaying in a part different from the unit configuration diagram.

FIG. 8 and FIG. 9 are examples of displaying the functional units of the control device 300 in a visually distinguishable manner in FIG. 3 for selecting the auto-updating and the manual-updating and in FIG. 5 for selecting the versions in the manual-updating in Embodiment 1. As described above, the flows themselves of the auto-updating process and the manual-updating process are the same as those in Embodiment 1.

As described above, in Embodiment 2, the update screen creation unit 114 displays the components of the control device 300 in a visually distinguishable manner, and creates, when a component being displayed is specified, the update screen that displays the information related to the update of the firmware for the component. This ensures that the user visually recognizes the target of the operation and prevents the user from making a mistake on a target to be updated. Thus, the updates can be managed properly while preventing the unintended updating by the user in updating the software of the engineering tool and the firmware of the control device.

Embodiment 3

An update management program according to Embodiment 3 will be described below. The configuration of the PC 100 and the flow of the auto-updating process and the manual-updating process are the same as those in Embodiment 1, so that their descriptions are omitted.

There is a case where the PC 100 manages the updates of a plurality of control devices 300 and the control devices 300 of the same or similar model or device configuration are installed in different plants, lines, and processes in the lines. In such a case, the user may mistake the target control device 300 for an update operation and perform the update operation on a control device 300 that is different from the intended control device 300. This may lead to a malfunction of the device.

In the present embodiment, in order to prevent the user from making such a mistake, the update screen created by the update screen creation unit 114 displays a tree-type data model structure in which production control elements such as information on the control devices 300 managed by the PC 100 in their updates, the plants, lines, processes in the lines, and the like which include the control devices 300, and the devices connected to and controlled by the control devices 300 are hierarchically represented. In such a display, it is made possible to specify an update target of the control devices 300 using visual recognition and perform the update operation such as selection of the auto-updating or the manual-updating of the versions.

Figure 10:
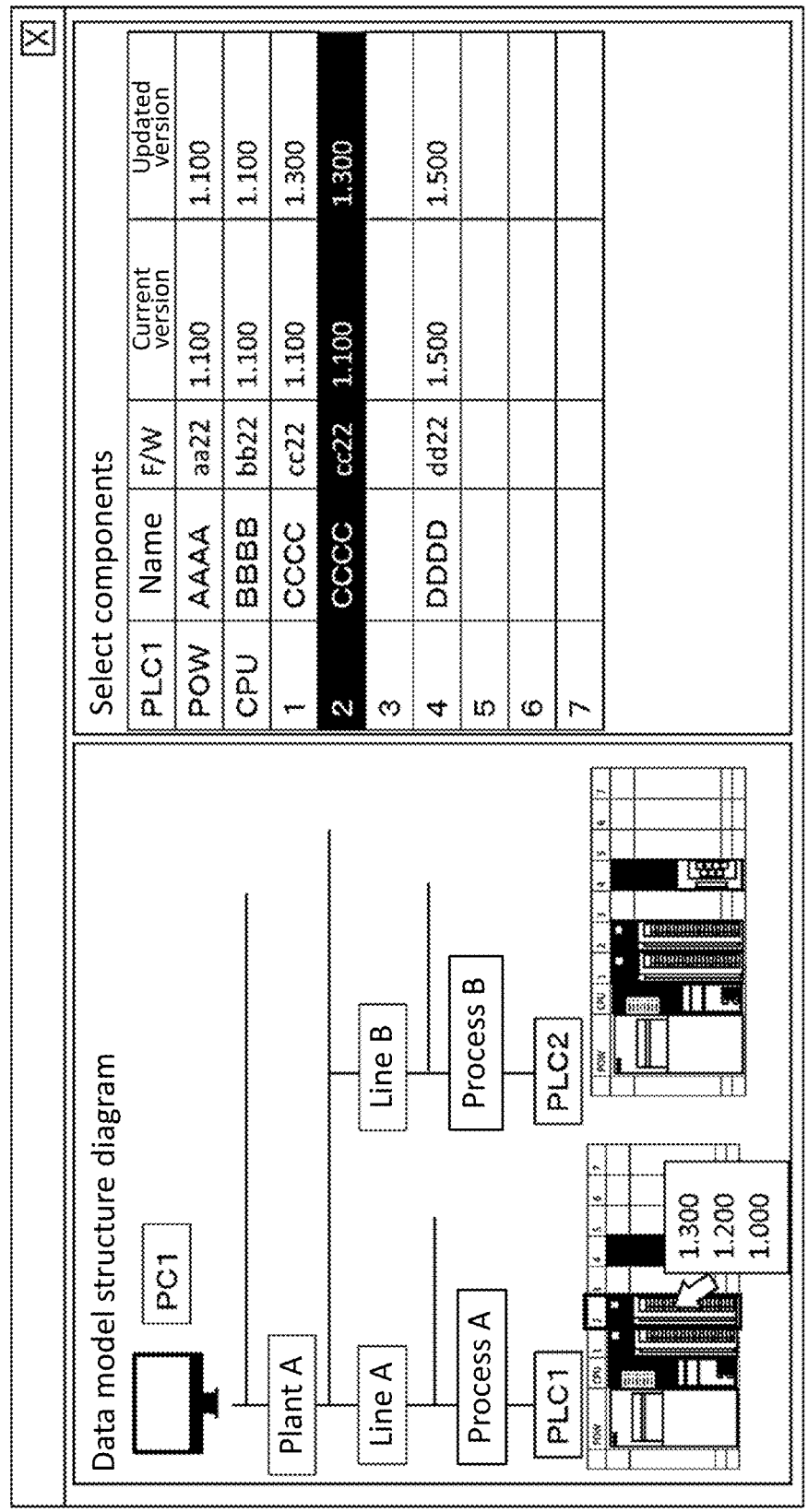
FIG. 10 is a diagram showing an example of an update screen according to Embodiment 3.

FIG. 10 is a diagram showing an example of an update screen according to Embodiment 3. In the illustrated data model structure, the PC 100 (PC1 in the figure) has the plurality of control devices 300 to manage in their updates, and the control devices 300 are hierarchically displayed along with the production management elements such as the plant, lines, and processes where they are installed. This display makes it possible to visually recognize that PLC1 for which the user intends to perform the update operation is installed in Process A of Line A in Plant A.

When a specific control device 300 or a functional unit which is a component of the control device 300 in the data model structure diagram is specified by the cursor of a mouse, the information related to the update of the firmware such as the available updated versions is displayed. Also, it is possible that when a specific control device 300 or a component of the control device 300 for which the update operation is intended is specified in the data model structure figure, a list including: the name of the control device or the component specified, the functional units; the firmware; and the current version and the latest version of the firmware is displayed, and the update operation of the firmware is performed by rewriting the content. It is also possible that when a specific control device 300 or a component thereof for which the update operation is intended is specified in the data model structure figure, the display is transitioned to the update screen of FIG. 8, in which the update operation is performed.

In FIG. 3 for selecting the auto-updating and the manual-updating and in FIG. 5 for selecting the versions in the manual-updating in Embodiment 1, FIG. 10 further shows in which plant, line, and process the control device 300 exists and to which device to be controlled it is connected in a tree-type data model structure. As described above, the flows themselves of the auto-updating process and the manual-updating process are the same as those in Embodiment 1.

As described above, in Embodiment 3, the update screen creation unit 114 displays the control devices 300 in a tree-type data model structure which hierarchically shows production management elements including the control devices 300 to be managed by the PC 100 in their updates and, in the case where a control device 300 or a component of the control device 300 is specified in the display, creates the update screen that displays the information related to the update of the firmware of the control device 300 or the component of the control device specified. The visual recognition of targets of the update operation prevents the user from making a mistake in selecting the update target. In updating the software of the engineering tools and the firmware of the control devices 300, this makes it possible to prevent the updates unintended by the user and to properly manage the updates.

Embodiment 4

An update management program according to Embodiment 4 will be described below. The configuration of the PC 100 corresponding to the information processing device that executes an update management program is the same as those in Embodiment 1, so that the description is omitted.

The update screen created by the update screen creation unit 114 allows selecting the auto-updating for each of the software of the engineering tools and the firmware of the control devices 300. The software and firmware with the auto-updating selected are automatically updated to the latest versions, but the software and firmware with the auto-updating not selected, in other words, with the manual-updating selected, are not updated in their versions unless the versions are updated by the manual-updating. As a result, there may be cases where the functions of the engineering tools or the control devices 300 are limited depending on the combinations of the versions of the software and the firmware.

Such functional limitation due to the inconsistencies in the versions can occur not only between software and firmware, but also between software as well as between firmware. Such functional restriction can occur for example: when the plurality of engineering tools is working together; when the plurality of control devices 300 is working together; and when the firmware of the plurality of the functional units on a control device 300 is working together. In particular, since the manual-updating allows the user to arbitrarily choose a version, such as downgrading a version, the problems described above could occur.

In the present embodiment, in a case where the updating versions could limit the functions previously available, the updating is put on hold and the user is notified of the possible functional limitation.

FIG. 11 is a diagram showing a content example of the updated version information. A column for the functional limitation is added to the updated version information shown in FIG. 2. The information on the functional limitation caused by the combinations of the versions between software and firmware, between software, and between firmware described above is written in the column for the functional limitation. In the example shown in FIG. 11, for the software "aa11" of the engineering tool "AAAA", no information is given in the column of the functional limitation up to the software version "1.100". That is, no functional limitation is caused in relation to the software versions of other engineering tools and the firmware versions of firmware of other control devices. However, when the software version is updated to "1.200", in the functional unit "BBBB" installed in the control device "BBBB", the function A becomes unavailable if the version number of the firmware "bb22" is "1.500" or smaller. In a case where the auto-updating will cause such a problem, the updating of the versions is put on hold and the user is notified of the possible functional limitation. Note that it is described that the information on functional limitation is included in the updated version information, but it may be different data. In this case, the information on functional limitation may be acquired not via the updated version acquisition unit 111.

Figure 12:
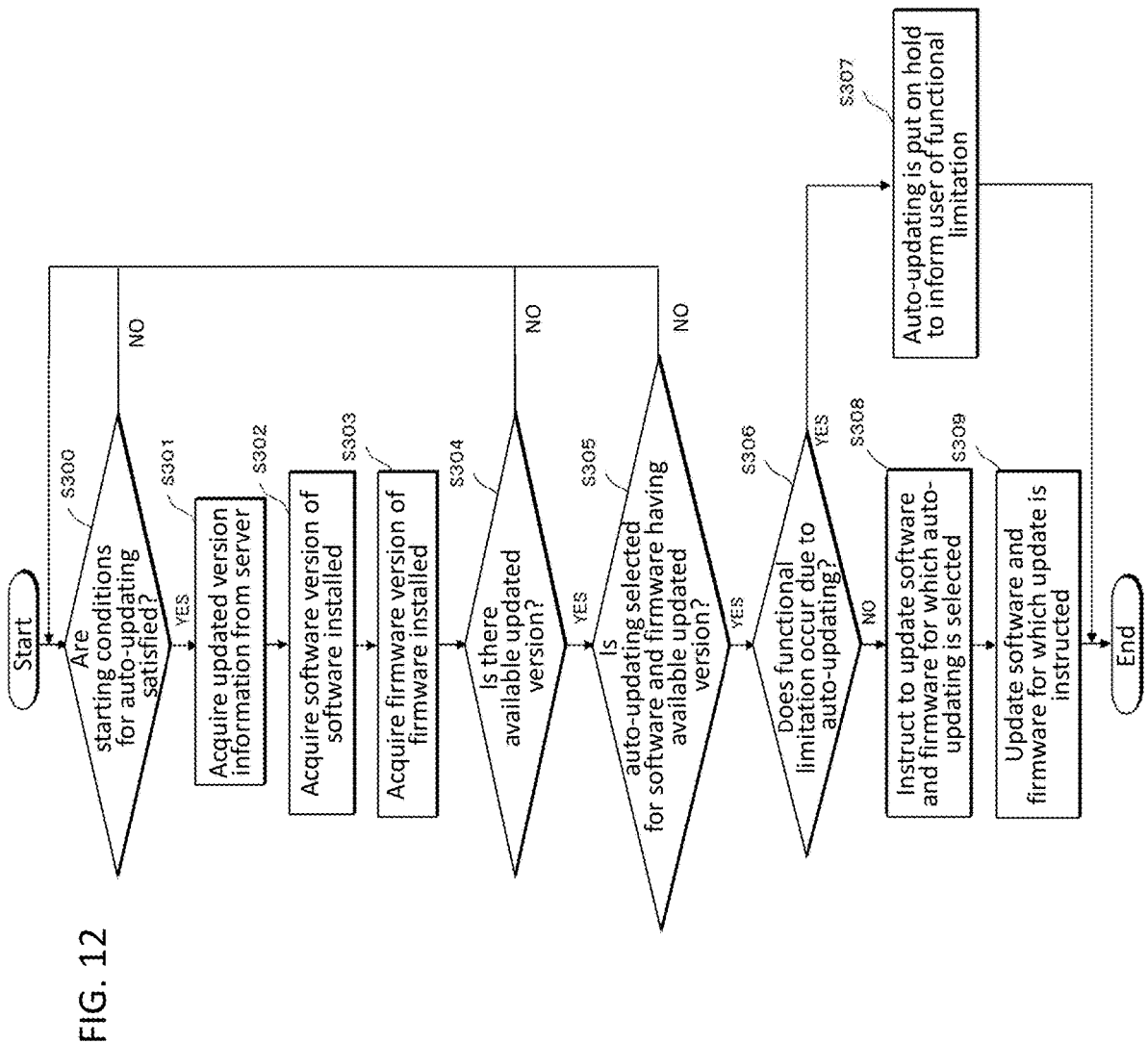
FIG. 12 is an example of a flowchart of an auto-updating process according to Embodiment 4.

FIG. 12 is an example of a flowchart of an auto-updating process according to Embodiment 4. Step S300 to Step S305 in FIG. 12 are the same as Step S100 to Step S105 in FIG. 6, so that their descriptions are omitted.

In Step S306, it is determined whether the auto-updating causes functional limitation. The information on functional limitation included in the updated version information is checked with respect to the software of the engineering tool and the firmware of the control device for which the auto-updating has been selected on the update screen and the updated version has been confirmed. Then, it is determined whether, if the update is executed, the combination of the versions of software and firmware after the updating causes the functional limitation.

When it is determined that no functional limitation occurs, the flow proceeds to Step S308. Then, the update management application 110 outputs an update instruction for the software and firmware to be updated. The auto-updating is executed in Step S309.

When it is determined in Step S306 that the functional limitation occurs, the flow proceeds to Step S307. The update management application 110 creates a screen that displays information about the functional limitation instead of outputting the update instruction. In the example in FIG. 11, the following message appears on the screen: "If you update the software "aa11" for the engineering tool "AAAA" to the version "1.200", the function A of the firmware "bb22" will become unavailable in the functional unit "BBBB" of the control device "BBBB". More preferably, the information about the combination of versions that resolves the functional limitation, such as "Update the version number of the firmware "bb22" to "1.600" or higher", may be included.

The above is an example for the auto-updating. However, in a case where the functional limitation due to inconsistency between the versions occurs also in the manual-updating, it is desirable to notify the user of the information regarding the functional limitation.

Figure 13:
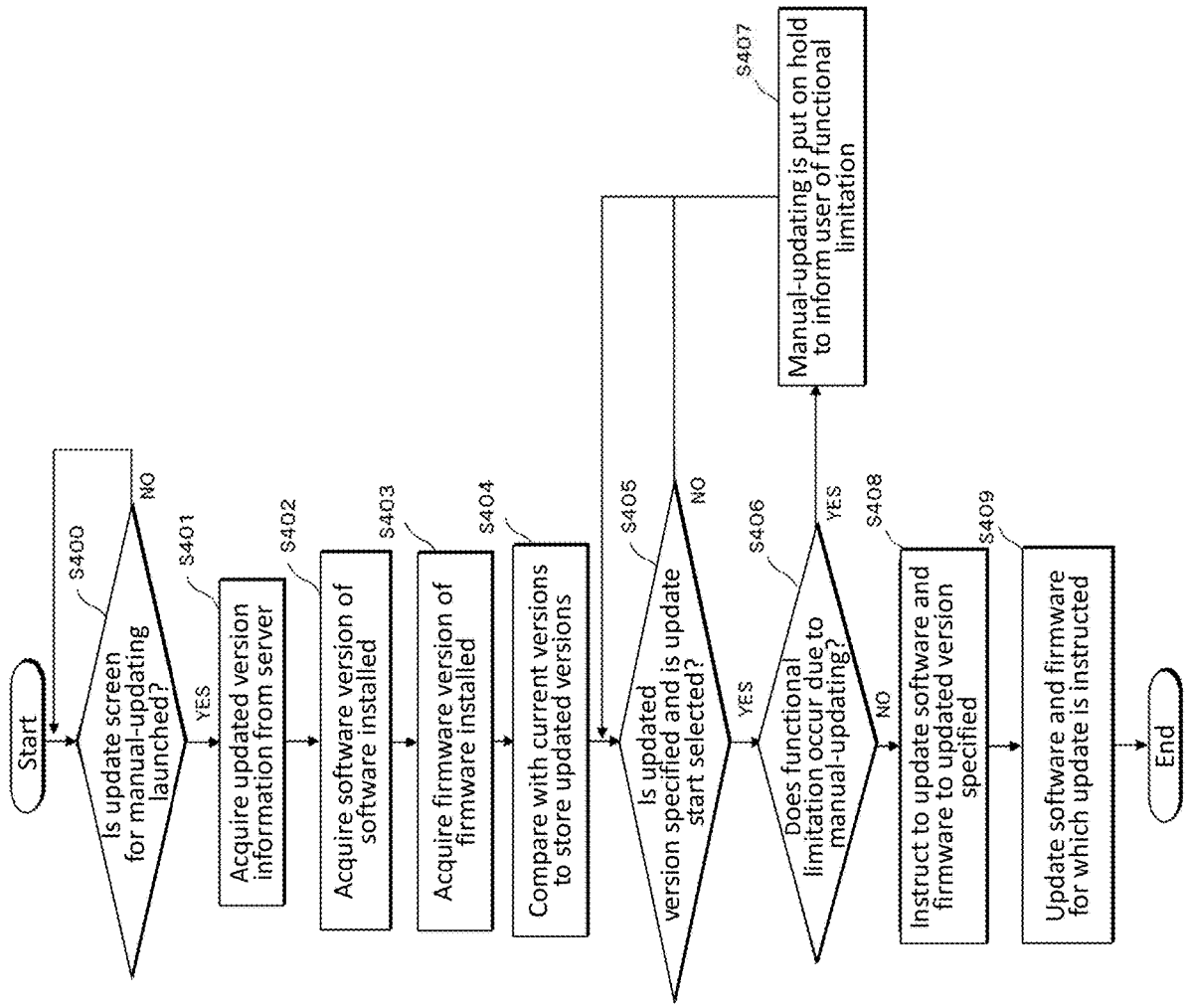
FIG. 13 is an example of a flowchart of a manual-updating process according to Embodiment 4.

FIG. 13 is an example of a flowchart of a manual-updating process according to Embodiment 4. Step S400 to Step S405 in FIG. 13 are the same as Step S200 to Step S205 in FIG. 7, so that their descriptions are omitted.

In Step S406, it is determined whether the manual-updating causes the functional limitation. The information on functional limitation of the updated version information is checked and it is determined whether the updating to the version specified by the user causes the functional limitation in the engineering tools and the control device 300 after the updating.

When it is determined that no functional limitation occurs, the flow proceeds to Step S408. Then, the update management application 110 outputs an update instruction for the software and firmware to be updated. The manual-updating is executed in Step S409.

When it is determined in Step S406 that the functional limitation occurs, the flow proceeds to Step S407. The update management application 110 creates a screen that displays information about the functional limitation instead of outputting the update instruction. The flow of the manual-updating process goes back to before Step S405. Seeing the notice of information about the functional limitation, the user is allowed to select another combination of the versions.

As described above, in Embodiment 4, in a case it is determined that the functional limitation occurs after the updating on the basis of the information on functional limitation occurring in the engineering tools or the control devices 300 when they are run with specific combinations of the versions of the software of the engineering tools and the firmware of the control devices 300, the update screen creation unit 114 creates a screen that displays the information about the functional limitation before executing the update. In updating the software of the engineering tools and the firmware of the control devices 300, this makes it possible to prevent the updates unintended by the user and to properly manage the updates.

Figure 14:
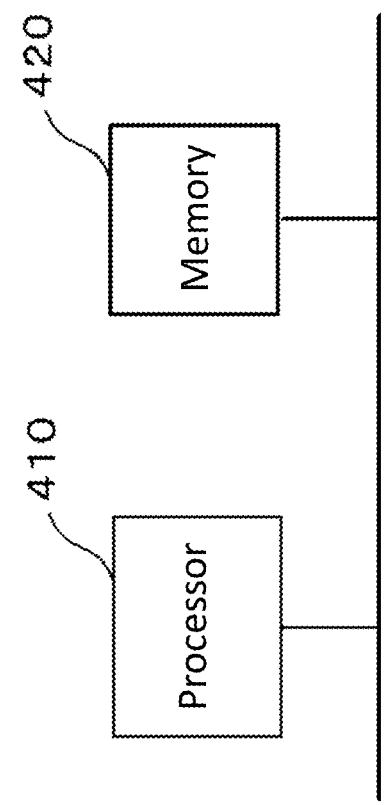
FIG. 14 is a diagram showing a hardware configuration example of an information processing device according to Embodiment 1.
Figure 15:
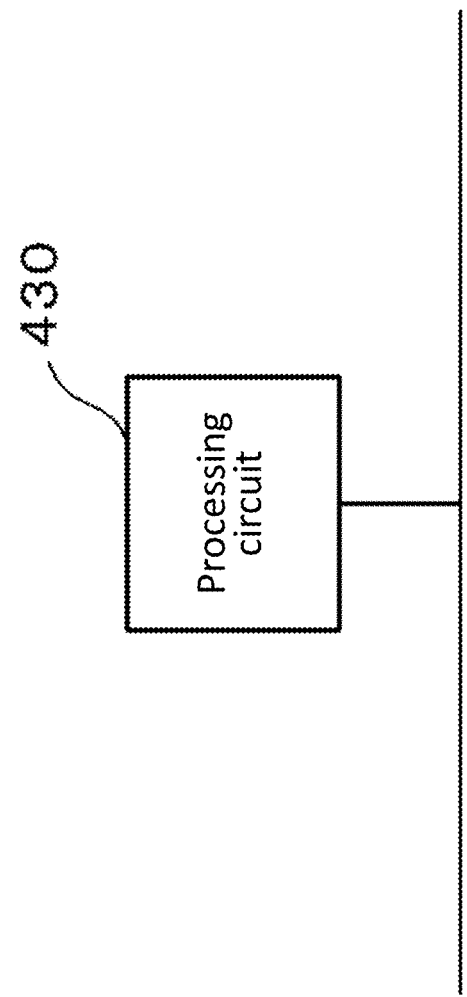
FIG. 15 is a diagram showing a hardware configuration example of the information processing device according to Embodiment 1.

FIG. 14 and FIG. 15 are a diagram showing a hardware configuration example of the information processing device according to Embodiment 1. The information processing device corresponds to the PC 100 in the present disclosure. The hardware configuration examples of the information processing device shown in Embodiments 2 to 5 are also the same as those in FIG. 14, so that the duplicate descriptions are omitted.

The update management application 110 is realized by the update management program being executed on the operating system (OS) of the PC 100. As shown in FIG. 14, the PC 100 includes at least one processor 410 and at least one memory 420. The update management program is stored in the memory 420. The processor 410 reads and executes the update management program, thereby performing all or part of the functions of the update management application 110.

Note that the update management application 110 is realized not only when one single update management program is executed on the PC 100. For example, the update management application may be realized as a function of some other application. Alternatively, the update management application may be realized by a combination of two or more applications. For example, the following configuration is possible, in which a first application realizes the functions of; the updated version acquisition unit 111; the software information acquisition unit 112; the version comparison unit 113; the update screen creation unit 114; and the software update instruction unit 115, and a second application realizes the remaining functions of the firmware information acquisition unit 121 and the firmware update instruction unit 122. The update management application 110 is realized as their combination.

The processor 410 is a central processing unit (CPU), a processing unit, an arithmetic unit, a microprocessor, or a digital signal processor (DSP). The memory 420 that stores the update management program is a non-volatile or volatile semiconductor memory such as a RAM, a ROM, a flash memory, an erasable programmable read only memory (EPROM), and an electrically erasable programmable read only memory (EEPROM: registered trademark), or a recording medium such as a magnetic disk, a flexible disk, an optical disk, a compact disc, a mini disc, and a digital versatile disk (DVD).

As shown in FIG. 15, each function of the update management application 110 may be realized by a dedicated processing circuit 430 in the PC 100. The processing circuit 430, for example, is a single circuit, a complex circuit, a programmed processor, a parallel programmed processor, an application specific integrated circuit (ASIC), a field-programmable gate array (FPGA), or a combination of these.

The configuration may be such that some of the functions of the update management application 110 are realized by the processor 410 and the memory 420 and the remaining functions are realized by the processing circuit 430.

The configurations shown in the embodiments above are each an example of the contents of the present invention. Combination with another known technology and omission or change in some of the configurations within the gist of the present invention are also possible.

DESCRIPTION OF SYMBOLS

100 PC
200 server
300 control device
110 update management application
111 updated version acquisition unit
112 software information acquisition unit
113 version comparison unit
114 update screen creation unit
115 software update instruction unit
121 firmware information acquisition unit
122 firmware update instruction unit
130 storing unit
140 display unit
150 input unit
210 storing unit
410 processor
420 memory
430 processing circuit

The invention claimed is:

1. A non-transitory computer-readable storage medium storing an update management program which, when executed in an information processing device, causes the information processing device to perform a process, comprising:
acquiring updated version information on software of an engineering tool and firmware of a control device;
acquiring a software version of the engineering tool installed in the information processing device;
acquiring a firmware version of the firmware installed in the control device to be connected to the information processing device;
confirming available updated versions for the software and for the firmware on the basis of comparison with the updated version information with the software version and the firmware version;

creating an update screen for selecting auto-updating for the software and the firmware installed; and instructing that the software of the engineering tool and the firmware for the control device for which the auto-updating is selected on the update screen and the updated versions are confirmed to be automatically updated to the updated versions, wherein a plurality of slots to mount components of the control device and the components mounted on the slots are displayed in a visually distinguishable manner and when one of the components of the control device being displayed is specified, the update screen is created to display information related to the update of the firmware of the component, the information including the available updated versions for the firmware of the component, and at least a portion of the information is displayed as an overlay on the components together with a visual indicator identifying the information displayed in the overlay as corresponding to the one of the components of the control device specified.

2. The non-transitory computer-readable storage medium storing the update management program according to claim 1, wherein in the process of creating the update screen, the update screen is created to allow setting a starting condition of the auto-updating.

3. The non-transitory computer-readable storage medium storing the update management program according to claim 2, wherein in the process of creating the update screen, the update screen is created to allow setting a content change in the updated version information as the starting condition of the auto-updating.

4. The non-transitory computer-readable storage medium storing the update management program according to claim 1, wherein in the process of creating the update screen, a tree-type data model structure hierarchically representing production control elements including the control device is displayed, and when one of the components of the control device being displayed is specified, the update screen displays the information related to the update of the firmware of the component specified.

5. The non-transitory computer-readable storage medium storing the update management program according to claim 2, wherein in the process of creating the update screen, a tree-type data model structure hierarchically representing production control elements including the control device is displayed, and when one of the components of the control device being displayed is specified, the update screen displays the information related to the update of the firmware of the component specified.

6. The non-transitory computer-readable storage medium storing the update management program according to claim 3, wherein in the process of creating the update screen, a tree-type data model structure hierarchically representing production control elements including the control device is displayed, and when one of the components of the control device being displayed is specified, the update screen displays the information related to the update of the firmware of the component specified.

7. The information processing device according to claim 1, wherein the visual indicator is an arrow pointing to the one of the components of the control device specified.

8. An information processing device comprising processing circuitry:

to acquire updated version information on software of an engineering tool and firmware of a control device;

to acquire a software version of the engineering tool installed in the information processing device;

to acquire a firmware version of the firmware installed in the control device to be connected to the information processing device;

to confirm available updated versions for the software and for the firmware on the basis of comparison with the updated version information with the software version and the firmware version; and to create an update screen for selecting auto-updating for the software and the firmware installed, wherein the information processing device instructs that the software of the engineering tool and the firmware of the control device for which the auto-updating is selected on the update screen and the updated versions are confirmed to be automatically updated to the updated versions, a plurality of slots to mount components of the control device and the components mounted on the slots are displayed in a visually distinguishable manner and when one of the components of the control device being displayed is specified, the update screen is created to display information related to the update of the firmware of the component, the information including the available updated versions for the firmware of the component, at least a portion of the information being displayed as an overlay on the components together with a visual indicator identifying the information displayed in the overlay as corresponding to the one of the components of the control device specified.

9. The information processing device according to claim 8, wherein to create the update screen, the processing circuitry is further configured to create the update screen to allow setting a starting condition of the auto-updating.

10. The information processing device according to claim 9, wherein to create the update screen the processing circuitry is further configured to create the update screen to allow setting a content change in the updated version information as the starting condition of the auto-updating.

11. The information processing device according to claim 8, wherein to create the update screen the processing circuitry is further configured to display a tree-type data model structure hierarchically representing production control elements including the control device, and when one of the components of the control device being displayed is specified, cause the update screen to display the information related to the update of the firmware of the component specified.

12. The information processing device according to claim 9, wherein to create the update screen, the processing circuitry is further configured to display a tree-type data model structure hierarchically representing production control elements including the control device, and when one of the components of the control device being displayed is specified, cause the update screen to display the information related to the update of the firmware of the component specified.

13. The information processing device according to claim 10, wherein to create the update screen, the processing circuitry is further configured to display a tree-type data model structure hierarchically representing production control elements including the control device, and when one of the components of the control device being displayed is specified, cause the update screen to display the information related to the update of the firmware of the component specified.

14. An update management method for making an information processing device execute update of software of an engineering tool and firmware of a control device by using an update management program, the update management method comprising:
  acquiring updated version information on the software of the engineering tool and the firmware of the control device;
  acquiring a software version of the engineering tool installed in the information processing device;
  acquiring a firmware version of the firmware installed in the control device connected to the information processing device;
  confirming available updated versions for the software and for the firmware on the basis of comparison with the updated version information with the software version and the firmware version;
  creating an update screen for selecting auto-updating for the software of the engineering tool and the firmware of the control device;
  instructing that the software of the engineering tool and the firmware of the control device for which the auto-updating is selected on the update screen and the updated versions are confirmed to be automatically updated to the updated versions; and
  displaying a plurality of slots to mount components of the control device and the components mounted on the slots in a visually distinguishable manner, and creating, when one of the components of the control device being displayed is specified, the update screen is created to display information related to the update of the firmware of the component, the information including the available updated versions for the firmware of the component, at least a portion of the information being displayed as an overlay on the components together with a visual indicator identifying the information displayed in the overlay as corresponding to the one of the components of the control device specified.

15. The update management method according to claim 14, wherein in the process of creating the update screen, the update screen is created to allow setting a starting condition of the auto-updating.

16. The update management method according to claim 15, wherein in the process of creating the update screen, the update screen is created to allow setting a content change in the updated version information as the starting condition of the auto-updating.

17. The update management method according to claim 14, wherein in the process of creating the update screen, a tree-type data model structure hierarchically representing production control elements including the control device is displayed, and when one of the components of the control device being displayed is specified, the update screen displays the information related to the update of the firmware of the component specified.

18. The update management method according to claim 15, wherein in the process of creating the update screen, a tree-type data model structure hierarchically representing production control elements including the control device is displayed, and when one of the components of the control device being displayed is specified, the update screen displays the information related to the update of the firmware of the component specified.

19. The update management method according to claim 16, wherein in the process of creating the update screen, a tree-type data model structure hierarchically representing production control elements including the control device is displayed, and when one of the components of the control device being displayed is specified, the update screen displays the information related to the update of the firmware of the component specified.

* * * * *